(12) United States Patent
Gobbi et al.

(10) Patent No.: US 11,701,928 B2
(45) Date of Patent: Jul. 18, 2023

(54) RIM FOR WHEEL WITH SENSOR AND WHEEL COMPRISING SAID RIM

(71) Applicant: POLITECNICO DI MILANO, Milan (IT)

(72) Inventors: Massimiliano Gobbi, Milan (IT); Gianpiero Mastinu, Milan (IT); Stefano Dell'Agostino, Milan (IT)

(73) Assignee: POLITECNICO DI MILANO, Milan (IT)

( * ) Notice: Subject to any disclaimer, the term of this patent is extended or adjusted under 35 U.S.C. 154(b) by 329 days.

(21) Appl. No.: 16/981,401

(22) PCT Filed: Mar. 14, 2019

(86) PCT No.: PCT/IB2019/052091
§ 371 (c)(1),
(2) Date: Sep. 16, 2020

(87) PCT Pub. No.: WO2019/175833
PCT Pub. Date: Sep. 19, 2019

(65) Prior Publication Data
US 2021/0023893 A1    Jan. 28, 2021

(30) Foreign Application Priority Data
Mar. 16, 2018    (IT) .................. 102018000003697

(51) Int. Cl.
*B60C 23/04*    (2006.01)
*G01L 1/14*    (2006.01)
*G01L 5/20*    (2006.01)

(52) U.S. Cl.
CPC ...... *B60C 23/0474* (2013.01); *B60C 23/0493* (2013.01); *G01L 1/142* (2013.01); *G01L 5/20* (2013.01)

(58) Field of Classification Search
CPC . B60C 23/0474; B60C 23/0493; G01L 1/142; G01L 5/20
(Continued)

(56) References Cited

U.S. PATENT DOCUMENTS 5,793,285 A    8/1998  Wehinger
7,832,288 B2 *  11/2010  Caretta ................. G01L 5/169
                                                    73/862.046
(Continued)

FOREIGN PATENT DOCUMENTS

DE    19744611 A1    4/1999
DE    10001272 A1    7/2001
(Continued)

OTHER PUBLICATIONS

International Search Report and Written Opinion dated May 22, 2019 in corresponding International Application No. PCT/IB2019/052091; 13 pages.

*Primary Examiner* — Eric Blount
(74) *Attorney, Agent, or Firm* — Maier & Maier, PLLC

(57) ABSTRACT

A rim for wheel is described including a measuring system for detecting the vertical load applied to the wheel. The measuring system includes a sensor adapted to detect a deformation of the rim and to transmit a deformation signal to a processing unit. The processing unit receives an output signal of the sensor related to the deformation of the rim detected, and determines the vertical load applied to the wheel.

15 Claims, 7 Drawing Sheets

(58) Field of Classification Search
USPC .......................................................... 340/438
See application file for complete search history.

(56) References Cited

U.S. PATENT DOCUMENTS

| | | | |
|---|---|---|---|
| 8,874,386 B2* | 10/2014 | Brusarosco | B60C 23/06 |
| | | | 73/146 |
| 9,404,820 B2 | 8/2016 | Gutierrez Lopez et al. | |
| 2004/0162680 A1* | 8/2004 | Shiraishi | G01L 5/20 |
| | | | 702/43 |
| 2007/0065060 A1 | 3/2007 | Koike et al. | |
| 2009/0125251 A1* | 5/2009 | Caretta | G01M 17/013 |
| | | | 702/42 |
| 2009/0180722 A1 | 7/2009 | Dougherty et al. | |

FOREIGN PATENT DOCUMENTS

| | | |
|---|---|---|
| EP | 0637734 A1 | 2/1995 |
| EP | 1426259 A1 | 6/2004 |
| EP | 1516794 A1 | 3/2005 |
| WO | 2005/108945 A1 | 11/2005 |
| WO | 2018/016236 A1 | 1/2018 |

\* cited by examiner

| Vertical force [N] | Longitudinal Force [N] | Longitudinal/Vertical ratio | ΔSignal [N] |
|---|---|---|---|
| 4850 | 3650 | 0.75 | 50 |
| 7250 | 5500 | 0.75 | 100 |

RIM FOR WHEEL WITH SENSOR AND WHEEL COMPRISING SAID RIM

TECHNICAL FIELD

The present invention relates to the sector of control systems for motor vehicles and in particular to that of sensored wheels.

BACKGROUND

There is currently a strongly felt need to monitor the operating conditions of road vehicles, both for the purpose of guaranteeing road safety, and for planning road maintenance. For example, knowing the weight of the vehicles that transit on a road allows the wear on the road surface to be estimated and the resurfacing thereof to be suitably planned.

In order to monitor the operating conditions of a vehicle, and in particular the load on a wheel, many solutions have been proposed.

Patents US20070065060 and EP0637734 envisage the use of a load sensor inside the ball bearing that uncouples the axle shaft from the hub bracket. The sensor is, however, located in a position that is difficult to reach in the event of maintenance.

Patents US2009180722 and U.S. Pat. No. 5,793,285 disclose the use of sensors for measuring hub deformations. However, also in this case, access to the sensor for maintenance is complicated.

Other systems, such as EP1516794 and DE19744611, instead envisage sensors that are mounted on the wheel. In particular, these solutions exploit optical systems that are placed between the rim and the tyre that determine the load as a function of the deflection of the tyre. However, these systems have the limit that the deformation of the tyre depends not only on the load applied, but also on the mix and structure of the tyre, thus with the same load applied different tyres are deformed in different ways.

EP1426259 describes a method and a device for determining the force exerted on a wheel of a vehicle. In the first place, data are obtained on a relationship between the tension of the wheel in angularly and radially predetermined measurement positions. The data obtained are used to define a formula of the force acting on the wheel. During the rolling of the wheel the physical parameter is measured and the force is processed.

DE10001272 describes a wheel of a vehicle in which a sensor is arranged on the perimeter of the wheel rim, to measure the deformation of the rim in the peripheral direction. Furthermore, a processing unit determines predetermined forces of a tyre through a calculation process based on the deformations detected on the perimeter of the rim. U.S. Pat. No. 9,404,820 describes a method for measuring the forces and moments generated by the tyre-road contact from the combination of deformation signals measured in different angular and radial positions of the wheel. The combination of deformation signals implies six or more independent signals from the angular position of the measurement sensors with respect to the tyre-road contact point. Said signals provide estimates of the loads through the resolution of two systems of linear equations with constant matrices and three unknowns each.

WO2005108945 describes a method for determining the force at the hub of a wheel of a vehicle whilst travelling. The wheel comprises a rim and at least one deformation sensor directly associated with said rim in at least one predetermined position and arranged according to at least one predetermined orientation. The method envisages detecting at least one deformation component of said rim during rotation. Then a correlation parameter is applied to the deformation component between the force at the hub and the relative deformation of said rim, which is characteristic of the rim used, to determine at least one force component at the hub.

WO2018016236 describes a wheel provided with a detection device. The detection device comprises a shift extraction element, a part to be detected and a detecting part. The shift extraction element extends in the radial direction of the wheel, and comprises a free end and a constrained end. The detecting part is coupled to the free end of the shift extraction element in proximity to the part to be detected. The output signal of the detection device changes based on changes in the positional relationship of the detecting part and of the part to be detected.

Therefore, a need is perceived for monitoring systems that allow efficient measurement of the load supported by a wheel and are at the same time easy to install and maintain.

SUMMARY

It is therefore an object of the present invention to solve the problems of known systems for monitoring the load applied to a wheel of a vehicle.

In particular, it is an object of the present invention to allow easy installation of the system for measuring the load applied to the wheel of a vehicle.

It is also an object of the present invention to allow easier maintenance of the system for measuring the load applied to the wheel of a vehicle.

These and other objects of the present invention will become clearer from the following description and appended claims, which form an integral part of the present description.

According to a first aspect, the invention therefore relates to a rim for wheel comprising a measuring system for detecting a vertical load applied to the wheel in mounted wheel conditions with a horizontal rotation axis. The measuring system comprises a sensor that detects a deformation of the rim and transmits a relevant deformation signal to a processing unit. The latter receives the deformation signal and determines the vertical load applied to the wheel.

This solution offers the advantage of allowing quick installation of the measuring system on the vehicle. In fact, it is sufficient to change the wheel of a vehicle without a measuring system to equip the vehicle with a measuring system.

In one embodiment, the sensor is housed in a seat on a surface of the rim and the sensor is adapted to detect a deformation of such seat. In particular, if the rim comprises a plurality of spokes then the seat is preferably obtained on one of these spokes. If the rim is of the type that comprises an annular element adapted to house a tyre, and a frontal disc applied to the aforementioned annular element, then the seat is preferably obtained on a surface of the disc that faces the annular element.

Reading the deformation of a seat obtained on the rim is particularly advantageous as it has contained dimensions and is therefore suited to allowing a detection of the load with greater precision. Then, placing the seat in points that are particularly strained by the vertical load, such as those indicated above, allows the deformations of the seat to be appreciated more and the measurement of the load to be improved.

Preferably the sensor is a capacitive type sensor comprising a pair of metal armatures and a dielectric material interposed between said metal armatures. This solution is particularly advantageous as the deformation of the rim and, in particular, of the seat that houses the sensor, cause a relative movement of the armatures depending on the load.

Then, advantageously, in the case of a capacitive type sensor, this dielectric material is chosen in the group comprising the following materials: cellulose acetate, copolymers, fluoropolymers, Polymers, Tedlar®. These materials are particularly efficient in the working range envisaged for most ground vehicles such as cars that travel at any average speed comprised between 0 and 130 km/h.

In one embodiment, the processing unit is adapted to store measurements made by the sensor and to detect a first absolute minimum value $L_{MIN}$ of the deformation signal, a second absolute maximum value $L_{MAX}$ of the deformation signal and a relative minimum value $L_{t\_med}$ of the deformation signal. The processing unit is therefore configured to calculate a value of the vertical load applied to the wheel according to the following formula:

$$\begin{bmatrix} F_V \\ F_L \end{bmatrix} = \begin{bmatrix} C_{11} & C_{12} & C_{13} \\ C_{21} & C_{22} & C_{23} \end{bmatrix} \begin{bmatrix} L_{MIN} \\ L_{MAX} \\ L_{t_{MED}} \end{bmatrix}$$

where $F_V$ is said vertical load, $F_L$ is a lateral load applied to the wheel, the coefficients $C_{ij}$, with i ranging between 1 and 2 and j between 1 and 3, are constant.

In one embodiment, the measuring signal also comprises means for detecting a pressure of a tyre mounted on the rim, and the processing unit is configured to correct the value of the Cij coefficients as follows:

$$Cij' = Cij*k*P$$

where P is the measured pressure value and k a predetermined constant.

In one embodiment, the rim further comprises means adapted to detect a temperature value of the tyre. In this embodiment, the processing unit is adapted to store measurements made by said sensor and to detect a first absolute minimum value $L_{MIN}$ of the deformation signal, a second absolute maximum value $L_{MAX}$ of the deformation signal and a relative minimum value $L_{t\_med}$ of the deformation signal. The processing unit is therefore adapted to calculate a value of the vertical load applied to the wheel according to the following formula:

$$\begin{bmatrix} F_V \\ F_L \end{bmatrix} = \begin{bmatrix} C_{11} & C_{12} & C_{13} \\ C_{21} & C_{22} & C_{23} \end{bmatrix} \begin{bmatrix} L_{MIN} \\ L_{MAX} \\ L_{t_{MED}} \end{bmatrix} + \begin{bmatrix} K_1 \\ K_2 \end{bmatrix}$$

where $F_V$ is said vertical load, $F_L$ is a lateral load applied to the wheel, the coefficients $C_{ij}$, with i ranging between 1 and 2 and j between 1 and 3, are constant, and wherein $K_1$ and $K_2$ depend on the temperature measured.

In this embodiment, the measuring system comprises means adapted to detect a temperature value of the tyre and the processing unit is configured to determine $K_1$ and $K_2$, for example through selection from among a plurality of stored values, as a function of the detected temperature value.

The invention also relates to a wheel comprising a tyre mounted on a rim provided with a measuring system as indicated above and better described in the following preferred embodiments.

The invention also relates to a vehicle, e.g. a car or a truck, comprising the aforesaid wheel.

BRIEF DESCRIPTION OF THE DRAWINGS

Further features and advantages of the present invention will be more evident from the following description of some preferred embodiments thereof made with reference to the appended drawings.

The different features in the individual configurations can be combined with each other as preferred according to the previous description, should it be necessary to avail of the advantages resulting specifically from a particular combination.

Figure 1:
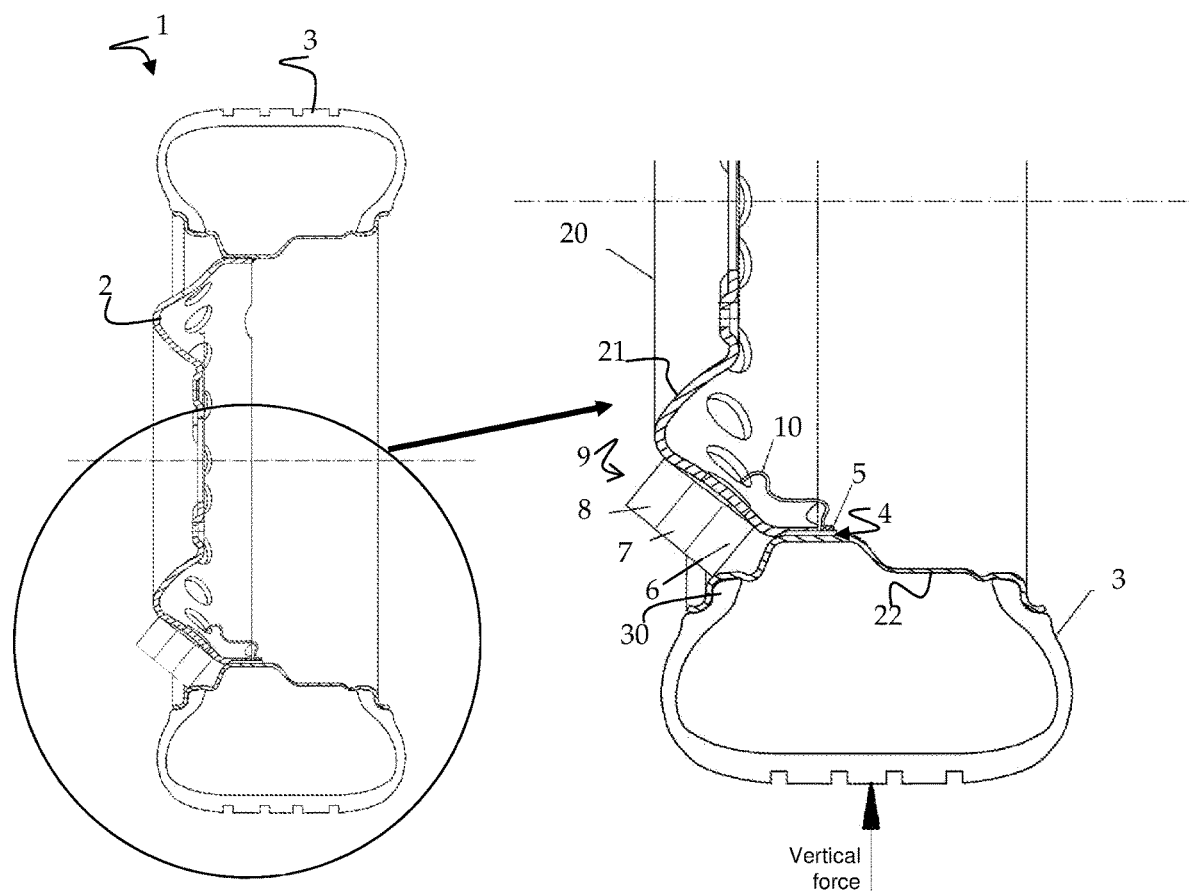
Figure 2A:
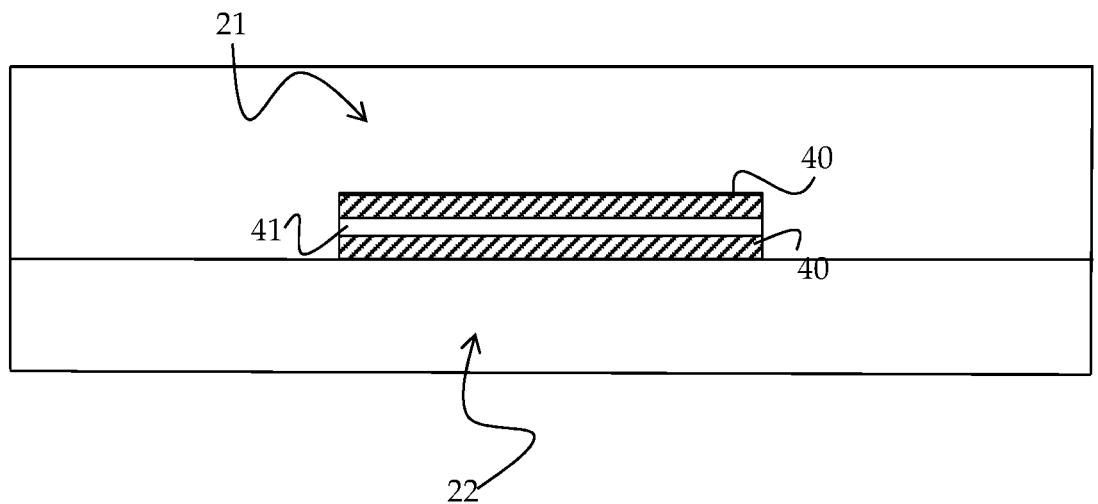
Figure 2B:
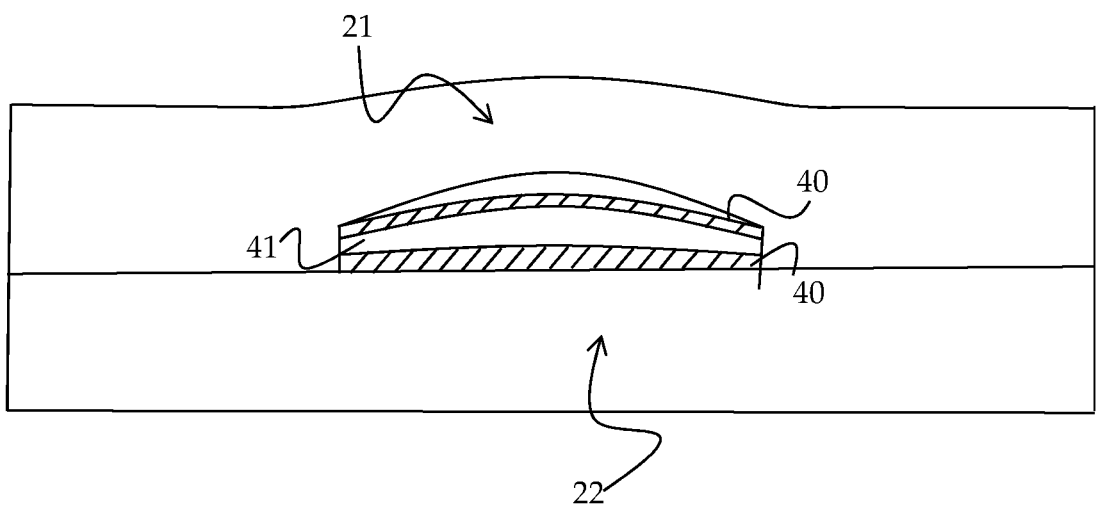
Figure 3:
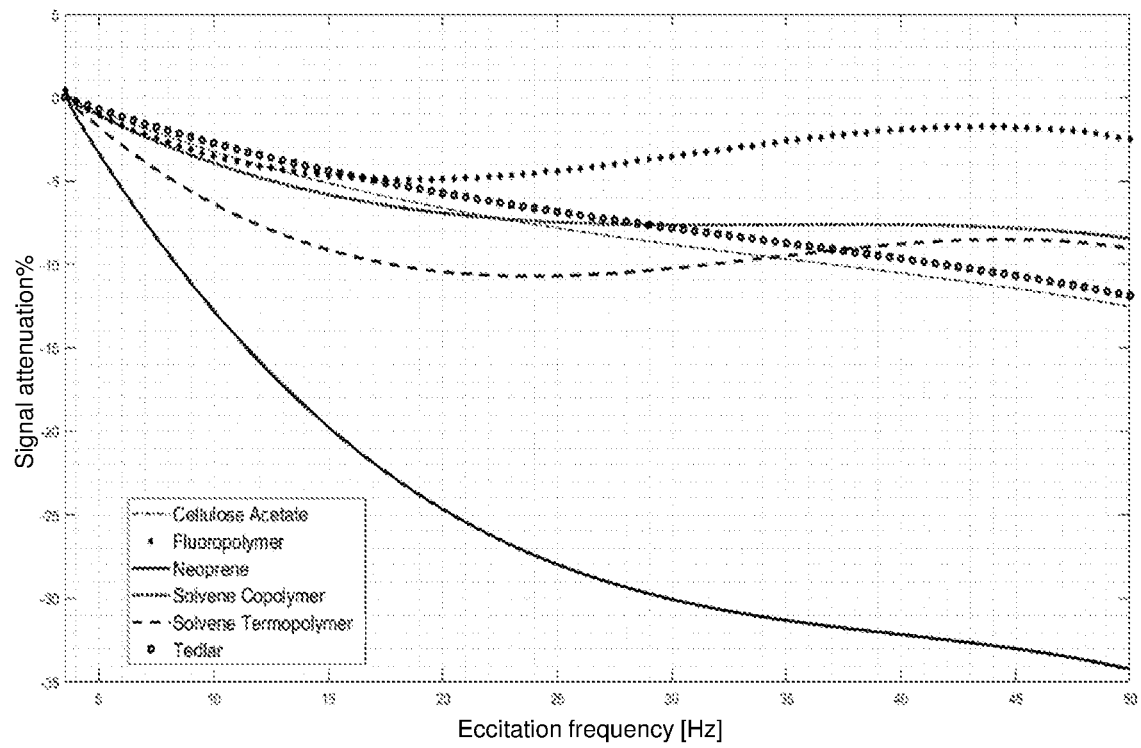
Figure 4:
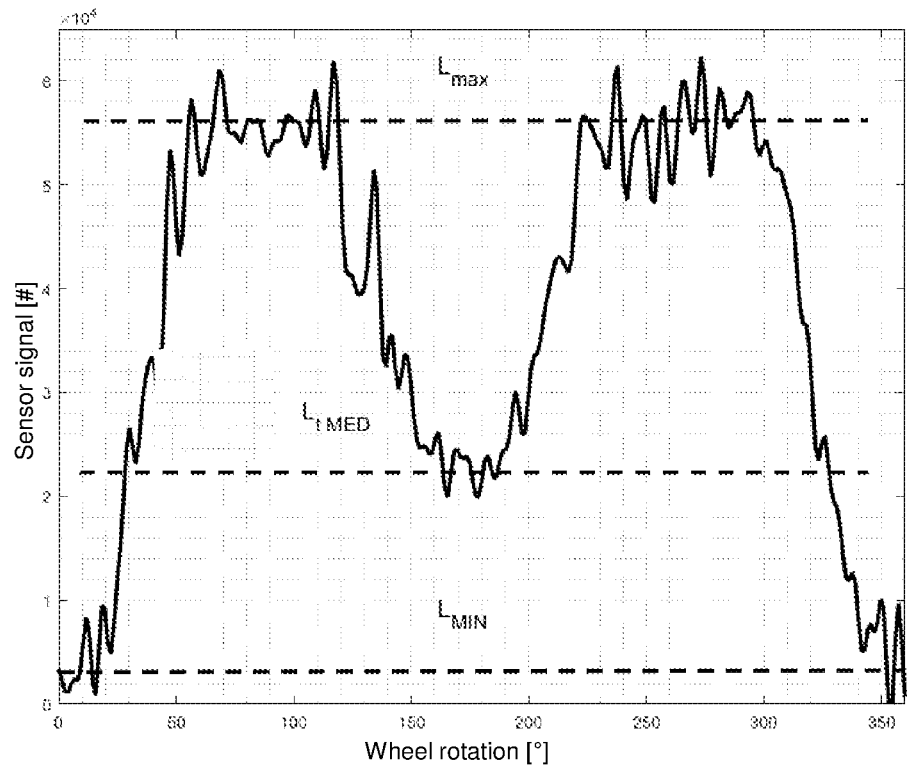
Figures 5, 6:
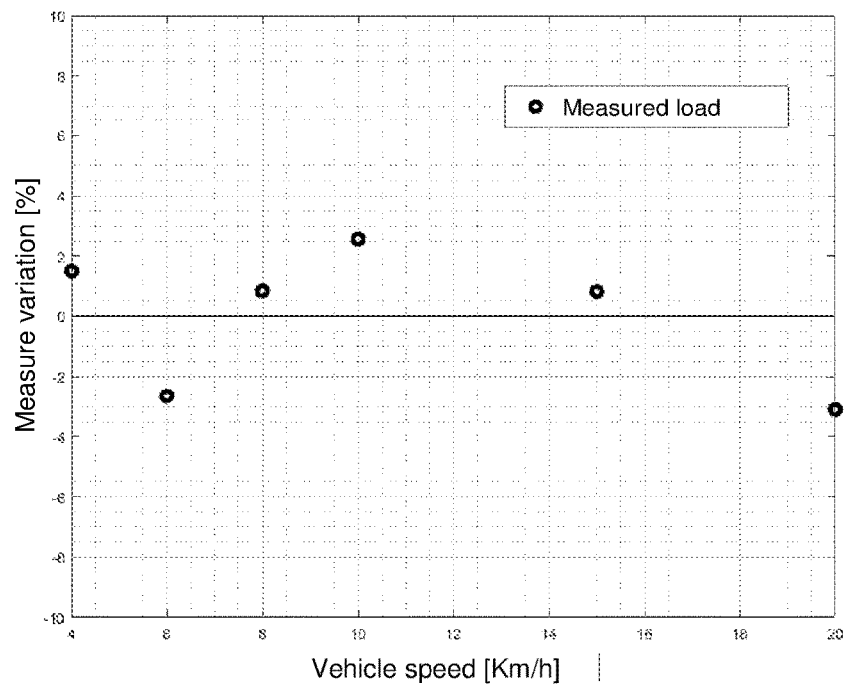
Figure 7:
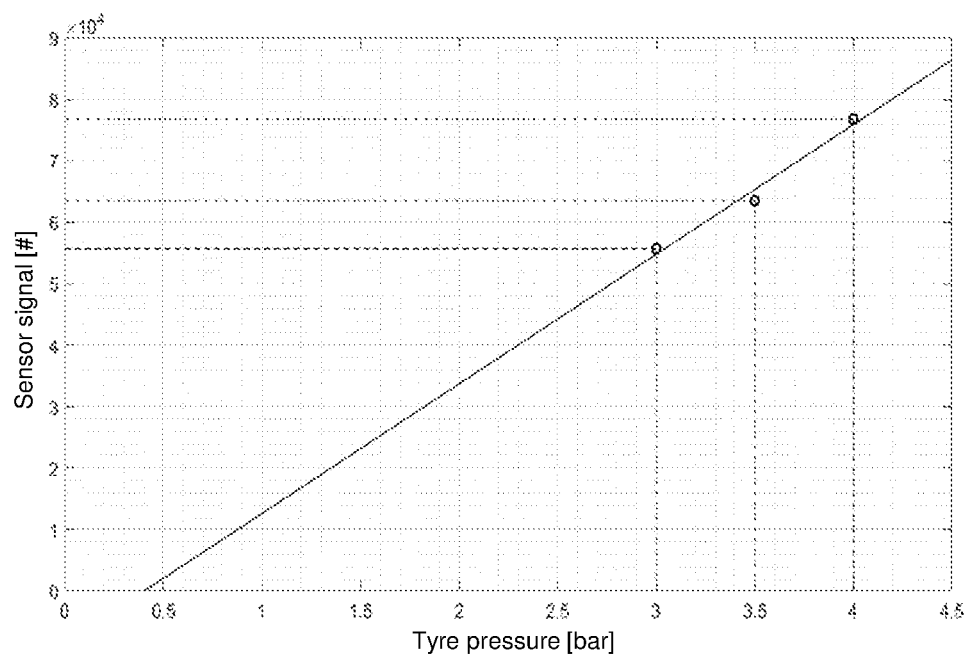
Figure 8:
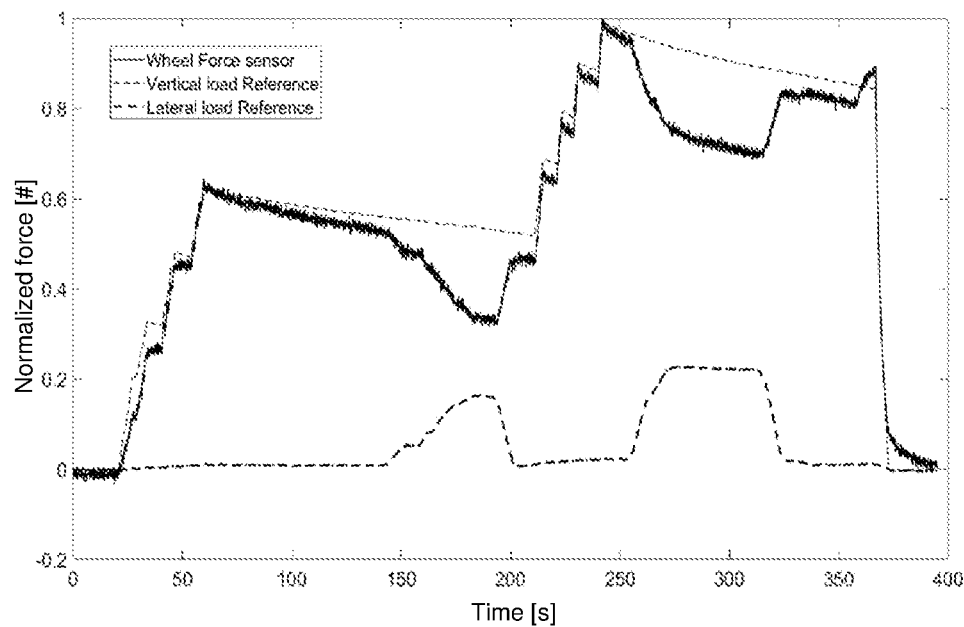
Figure 9:
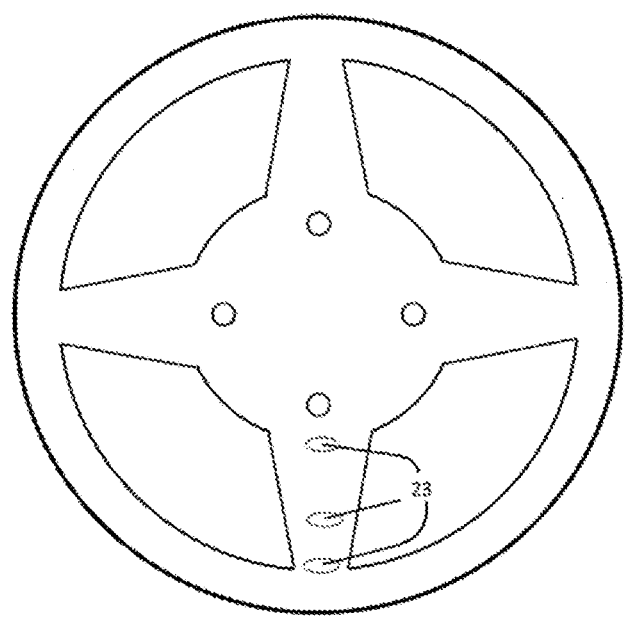
Figure 10A:
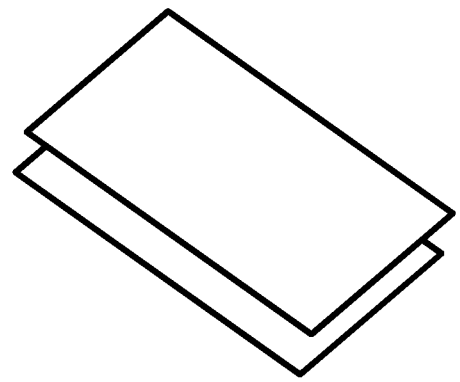
Figure 10B:
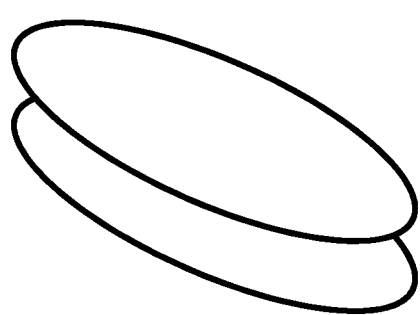
Figure 10C:
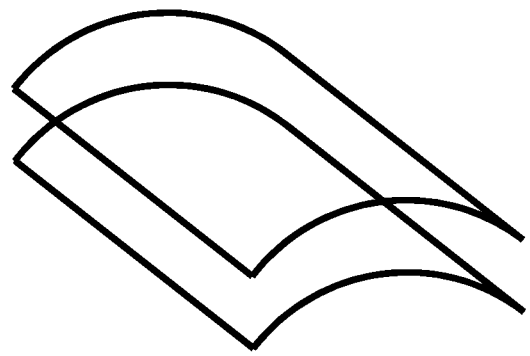
Figure 10D:
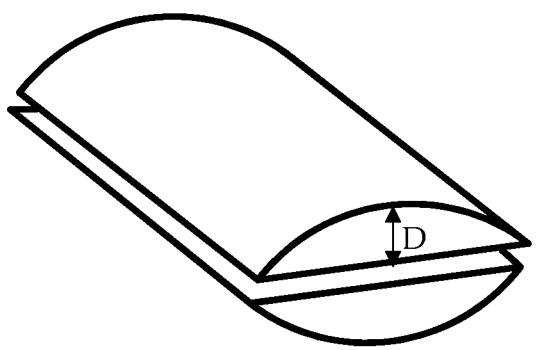
Figure 10E:
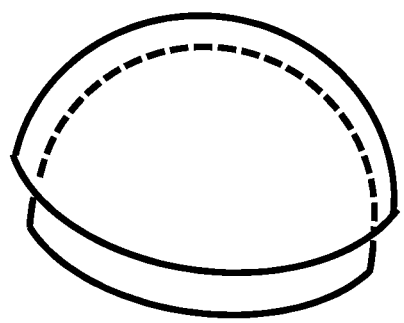

In such drawings,

FIG. 1 illustrates a wheel according to an embodiment of the present invention;

FIG. 2A illustrates a sensor inserted in a seat provided in the rim of the wheel of FIG. 1;

FIG. 2B schematically illustrates a deformation of the rim and of the sensor of FIG. 2A when the wheel is subject to a vertical load;

FIG. 3 illustrates the attenuation of the output signal of the sensor used in the wheel of FIG. 1 as the frequency and the dielectric material used changes;

FIG. 4 illustrates the output of the sensor of FIG. 1 as a function of the rotation angle of the wheel;

FIG. 5 illustrates the load variation measured by the sensor as a function of the rotation speed of the wheel;

FIG. 6 is a table that shows the influence of the longitudinal load on the measurement of the vertical one;

FIG. 7 illustrates the variation of the load measurement as the pressure increases;

FIG. 8 illustrates the measurement of the vertical load when a vertical and a horizontal load are applied;

FIG. 9 shows an alternative rim to that of FIG. 1;

FIG. 10A shows one of several different alternative embodiments for the armatures of a capacitive sensor;

FIG. 10B shows one of several different alternative embodiments for the armatures of a capacitive sensor;

FIG. 10C shows one of several different alternative embodiments for the armatures of a capacitive sensor;

FIG. 10D shows one of several different alternative embodiments for the armatures of a capacitive sensor; and FIG. 10E shows one of several different alternative embodiments for the armatures of a capacitive sensor.

DETAILED DESCRIPTION OF THE EMBODIMENTS

In the following description, for the illustration of the figures, identical numbers or reference symbols are used to indicate construction elements with the same function. Further, for illustration clarity, some references may not be repeated in all the figures.

While the invention is susceptible to various modifications and alternative constructions, certain preferred embodiments are shown in the drawings and are described hereinbelow in detail. It is in any case to be noted that there is no intention to limit the invention to the specific embodiment illustrated, rather on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "comprises" and "includes" means "comprises or includes, but not limited to", unless otherwise indicated.

With reference to FIG. 1 a sectional view of a wheel 1 is illustrated according to an embodiment of the present invention. In the following description the wheel is considered in the mounted condition, i.e. with a horizontal rotation axis.

The wheel 1 comprises in a known way a rim 2 on which a tyre 3 is mounted, and a measuring system able to measure a vertical load applied to the wheel in mounted conditions with a horizontal rotation axis.

In the example of FIG. 1 the rim is of the type comprising a frontal disc 20 welded to an annular element 21 whose radial surface forms the so-called channel 22 intended to house the heel 30 of the tyre 3.

The rim 1 is provided with a seat 23 in which a sensor 4 is housed that can detect deformations of the seat 23. Preferably the sensor 4 is a capacitive sensor, therefore provided with two conducting armatures 40 separated by a dielectric material 41.

The dielectric material 41 can be of various types, however, preferred materials are cellulose acetate, copolymers, fluoropolymers, thermopolymers and Tedlar®. Experimental tests performed by the Applicant (see FIG. 3), have demonstrated that these materials have reduced signal attenuation (percentage less than 10%) for the frequencies of interest, comprised between 0 and 50 Hz, corresponding to the rotation frequency of the sensor mounted on a rim of 22" of a vehicle that travels at a speed comprised between 0 and 130 km/h.

As illustrated in FIG. 2A, in conditions of null load applied to the wheel, the two elements 21 and 22 which, facing each other, define the walls of the seat 23 of the sensor are not deformed and the output of the electric signal of the sensor is stable at a threshold value that indicates a null load condition. When, instead, the wheel is subjected to a load (FIG. 2B), the two elements 21 and 22 are deformed and with them the shape of the seat 23, so that the two armatures 40 of the sensor 4 move translating and rotating with respect to each other. Such movement of the armatures causes a deformation of the dielectric material 41 and, therefore, a variation of the electric signal generated by the sensor. The variation of the electric signal of the sensor therefore depends on the load applied to the wheel and its measurement can be used to measure the load on the wheel.

Advantageously, the armatures of the capacitive sensor are shielded by means of a conductive layer, so as to reduce the noise coming from the vehicle, e.g. due to capacity due to contact between wheel and vehicle/ground.

In the example of FIG. 1, the capacitive sensor 4 is mounted on a PCB that also houses an analog-to-digital converter 5. The output of the sensor 4 is connected to the input of the analog-to-digital converter (A/D) 5, which converts the analog signal at the output of the sensor 4 into a digital signal that is then sent, through appropriate wiring 10, to a storage and processing unit 6, which performs a first local processing of the measurement of the sensor 4 and supplies the data to a wireless transmitter module 7 which transmits them to a remote unit, not illustrated in the figure, but preferably mounted on board the vehicle, e.g. a car or truck, on which the wheel 1 is mounted.

In the example of FIG. 1, the wireless transmitter 7 and the storage and processing unit 6 are housed in a case 8 that also houses an electric battery 9 able to supply the transmitter and all the other active elements of the system, such as the sensor 4, the A/D converter 5.

Experimental tests, reported in FIG. 4, have made it possible to verify that by applying a constant vertical load to the wheel, as the latter rotates, the output signal of the sensor has a peak $L_{MAX}$, when the sensor is located along the horizontal (values of 90° and 270° in the graphs of FIG. 4). The output signal of the sensor, instead, has an absolute minimum value $L_{MIN}$ when it is in the lowest part of the wheel (values of 0 and 360° in the graph of FIG. 4), and a relative minimum $L_{t\_med}$ when it is in the highest point of the wheel (value of 180° in the graph of FIG. 4).

Preferably, the absolute maximum $L_{MAX}$, absolute minimum $L_{MIN}$ and relative minimum $L_{t\_med}$ values are considered net of the disturbances and noise associated with the output signal of the sensor 4, as appears clear to a person skilled in the art from the example of FIG. 4. For example, the absolute maximum and minimum and relative values can be detected after filtering—such as lowpass filtering or bandpass filtering—of the output signal of the sensor 4, performed by the processing unit 6.

The Applicant has therefore, empirically, discovered that the lateral $F_L$ and vertical $F_V$ forces acting on the wheel can be obtained according to the following formula (1):

$$\begin{bmatrix} F_V \\ F_L \end{bmatrix} = \begin{bmatrix} C_{11} & C_{12} & C_{13} \\ C_{21} & C_{22} & C_{23} \end{bmatrix} \begin{bmatrix} L_{MIN} \\ L_{MAX} \\ L_{t_{MED}} \end{bmatrix} + \begin{bmatrix} K_1 \\ K_2 \end{bmatrix} \quad (1)$$

wherein the coefficients Cij are constant and depend on the pressure of the tyre.

In order to be able to calculate the vertical load $F_V$ and lateral load $F_L$ values, in a preferred embodiment the system for measuring the loads applied to the wheel also comprises means adapted to detect a pressure and temperature value of the tyre mounted on the rim. In one embodiment the means adapted to detect a pressure and temperature value comprise a sensor, e.g. a TPMS sensor, able to measure the inflation pressure of the tyre and the temperature of the air inside the tyre, the latter being connected to the temperature of the tyre itself.

In particular, it is to be noted that although the use of a pressure sensor is preferable for measuring the pressure of the tyre, other systems may be used, which indirectly determine a pressure value by measuring other parameters. For example, the measurement of the distance between the rim and the tyre depends on the shape, but also on the pressure, of the tyre, so that differential measurements of the distance between the rim and the tyre can be considered indirect measurements of the tyre pressure.

The means for detecting a pressure and temperature value of the tyre mounted on the rim can be mounted on the wheel, or be means already provided on the vehicle that mounts the wheel. In this case the storage and processing unit 6 can receive the pressure and temperature data from the remote unit of the vehicle through the wireless interface 7 that operates both as a transmitting module, as previously described, and as a receiving module for receiving data and/or controls from the remote unit of the vehicle.

In general, the coefficient values Cij can be empirically measured. The Applicant has verified that in tyre pressure conditions of 4 bar and temperature of 20° C. the following values are recorded:

$C_{11}=-1.12\cdot 10^{-1}$; $C_{12}=-1.58\cdot 10^{-2}$; $C_{13}=1.28\cdot 10^{-1}$;

$C_{21}=-5.33\cdot 10^{-2}$; $C_{22}=-3.57\cdot 10^{-2}$; $C_{23}=8.9\cdot 10^{-2}$;

In general, in usual operating conditions of a wheel, i.e. T comprised between −15° C. and T=45° C., and tyre pressure p comprised between 3 and 4.5 bar (commercial vehicle), the values mentioned above can vary by ±10%.

Although slightly less accurate, given that the temperature drift is not very important in formula (1), in an embodiment that does not require any temperature sensor, the values $K_1$ and $K_2$ can be assumed to be equal to zero in formula (1). Through experimental tests, the Applicant has also verified the existence of a linear relationship between the pressure of the tyre P and the coefficients Cij. The graph of FIG. 7 shows how, with the same vertical load applied, as the pressure increases the load value measured by the sensor also increases.

Therefore, the processing unit 6 is preferably configured to correct the value of coefficients Cij of formula (1) as follows:

$$Cij'=Cij*k*P$$

where P is the pressure and k is the experimental correlation coefficient that determines the sensitivity of the sensor to the pressure. Preferred values of k are comprised between $1\cdot 10^4$ and $2\cdot 10^4$. In general, the value of k can however be defined during the manufacturing of the wheel and be stored in a storage area of the storage and processing unit 6. In one embodiment, the storage and processing unit 6 can comprise different values of k stored in a comparison table where, for different types of tyre and tyre pressure, a predetermined value of k is associated. At the time of mounting the wheel on the vehicle, the mechanic can interface with the storage and processing unit through an appropriate user interface (e.g. a remote control terminal that communicates in Bluetooth to the unit 6) for selecting the value of k.

Experimental tests, reported in FIG. 8, have further demonstrated the effect of lateral forces on the measurement of the vertical force by the sensor that determine the ratio between the coefficients Cij.

Operatively, therefore, as the wheel 1 turns, the armatures of the capacitive sensor 4 move with respect to each other deforming the dielectrics interposed between them. This implies a variation to the signal generated by the sensor which, under ideal conditions, is repeated cyclically at each rotation and that has an absolute maximum $L_{MAX}$, an absolute minimum $L_{MIN}$ and a relative minimum $L_{t\_med}$. The processing unit 6 detects and stores these three values and calculates the values of the horizontal forces $F_L$ and vertical forces $F_V$ acting on the wheel.

The processing unit 6 transmits at least the value of the vertical force $F_V$, but preferably also the value of the horizontal force $F_O$ to the wireless transmitter 7.

The signal transmitted by the transmitter 7 is received by a remote control unit that re-transmits the signal (possibly re-processed) to external devices (e.g. remote control units) and/or uses the information transported by such signal (i.e. $F_L$ and $F_V$) for controlling actuators of the vehicle, e.g. for switching on alarm signals in the case of sudden variations of the load measured by a wheel.

Experimental tests have made it possible to verify that the system described above is resistant to noise and other factors that can in some way affect the measurement.

In particular, as illustrated in FIG. 5, the influence of the vehicle's translation speed is less than 4% and is random.

Experimental tests have then made it possible to verify (see table in FIG. 6) that the influence of the longitudinal load on the measurement of the vertical one is less than 3%.

Furthermore, as will be clear to a person skilled in the art, the system according to the embodiments of the present invention requires a single deformation signal for precisely identifying the horizontal forces $F_L$ and vertical forces $F_V$ acting on the wheel. This allows a system to be realized with extremely reduced dimensions and a single cable—for connecting the single sensor 4 to the storage and processing unit 6.

In light of what is described above it is clear to a person skilled in the art how the invention allows the intended objects to be reached. In particular, the positioning of the sensor in a seat obtained in the rim of the wheel allows easy installation and facilitated access to the sensor in case of maintenance.

Advantageously, the seat for the sensor is positioned in a point of the rim that is subject to the vertical load acting on the wheel, e.g. a portion of the channel for housing the tyre, or a spoke of a spoked rim. FIG. 9, for example, indicates different possible positions of a seat 23 for the sensor. Preferably, in case of spoked rims, a preferred position for the seat 23 is an area of the spoke that is located in the most external half of the spoke itself, i.e. in the proximal position of the channel.

For example, despite the invention being described above with reference to a capacitive type sensor, it is clear that the sensor can also be of another type, e.g. optical or inductive sensors can be provided, which measure deformations of a seat obtained in the rim.

Again, in the preferred solution of a capacitive condenser, it is clear that the sensor can have parallel plane armatures or also of another type. For example, the armatures can comprise parallel flat plane surfaces (e.g. FIGS. 10A and 10B) of any shape (e.g. rectangular as in FIG. 10A or elliptical as in FIG. 10B), or comprise curved plane surfaces (FIG. 10C), comprise semi-circular surfaces (FIG. 10E), have a constant thickness along the whole width thereof (e.g. FIG. 10A-10C) have a thickness 'D' that varies along the width, e.g. being maximum at the centre and minimum at the edges as in FIG. 10D.

The invention claimed is:

1. A rim for a wheel, including a measuring system to detect a vertical load applied to the wheel in operating conditions with wheel mounted with horizontal rotation axis,
   the measuring system comprising:
   a sensor to detect a deformation of the rim and to transmit a deformation signal related to the detected deformation, and
   a processing unit, operatively connected to the sensor, configured to receive the deformation signal, and to determine the vertical load applied to the wheel, based on the deformation of the rim detected by the sensor, the processing unit is configured to:
   store measurements made by the sensor and detects a first LMIN value of absolute minimum, a second LMAX value of absolute maximum and a Lt_med value of relative minimum of the deformation signal generated by said sensor during a rotation of the rim, and
   calculate the value of the vertical loads acting on the wheel, based on the detected a first LMIN value of absolute minimum, the second LMAX value of absolute maximum and the Lt_med value of relative minimum of the deformation signal generated by said sensor.

2. The rim according to claim 1, wherein the sensor is housed in a seat on a surface of the rim and the sensor is adapted to detect a deformation of said seat.

3. The rim according to claim 2, further comprising a plurality of spokes and wherein the seat is obtained on a spoke of the said plurality of spokes.

4. The rim according to claim 2, further including an annular element to house a tyre, and a frontal disc applied to the annular element, and wherein the seat is obtained on an area of the said disc that faces said annular element.

5. The rim according to claim 1, wherein the sensor is a capacitive type sensor comprising a pair of metal armatures and a dielectric material interposed between said metal armatures.

6. The rim According to claim 5, wherein this dielectric material is chosen in the group of materials comprising the following materials: cellulose acetate, copolymers, fluoropolymers, Polymers, Tedlar®.

7. The rim according to claim 1, wherein the processing unit is further adapted to calculate a value of the vertical load applied to the wheel according to the following formula:

$$\begin{bmatrix} F_V \\ F_L \end{bmatrix} = \begin{bmatrix} C_{11} & C_{12} & C_{13} \\ C_{21} & C_{22} & C_{23} \end{bmatrix} \begin{bmatrix} L_{MIN} \\ L_{MAX} \\ L_{t_{MED}} \end{bmatrix}$$

where $F_V$ is said vertical load, $F_L$ is a lateral load applied to the wheel, the coefficients Cij, with i ranging between 1 and 2 and j between 1 and 3, are constant.

8. The rim according to claim 7, further comprising means for detecting pressure of a tyre mounted on said rim, and where the processing unit is configured to correct the value of the Cij coefficients as follows:

$$Cij' = Cij * k * P$$

where Cij' are the corrected Cij coefficients, P is the measured pressure value and k a predetermined constant.

9. The rim according to claim 1, further comprising means adapted to detect a temperature value of the tyre and wherein said processing unit is adapted to store measurements made by said sensor, and wherein the processing unit is further adapted to calculate a value of the vertical load applied to the wheel according to the following formula:

$$\begin{bmatrix} F_V \\ F_L \end{bmatrix} = \begin{bmatrix} C_{11} & C_{12} & C_{13} \\ C_{21} & C_{22} & C_{23} \end{bmatrix} \begin{bmatrix} L_{MIN} \\ L_{MAX} \\ L_{t_{MED}} \end{bmatrix} + \begin{bmatrix} K_1 \\ K_2 \end{bmatrix}$$

where $F_V$ is said vertical load, $F_L$ is a lateral load applied to the wheel, the coefficients Cij, with i ranging between 1 and 2 and j between 1 and 3, are constant, $K_1$ and $K_2$ are two values depending on said detected temperature value.

10. The rim according to claim 9, further comprising means for detecting pressure of a tyre mounted on said rim, and where the processing unit is configured to correct the value of the Cij coefficients as follows:

$$Cij' = Cij * k * P$$

where Cij' are the corrected Cij coefficients, P is the measured pressure value and k a predetermined constant.

11. A wheel comprising a rim including a measuring system to detect a vertical load applied to the wheel in operating conditions with wheel mounted with horizontal rotation axis, and a tyre mounted on that rim,
the measuring system comprising:
a sensor to detect a deformation of the rim and to transmit a deformation signal related to the detected deformation, and
a processing unit, operatively connected to the sensor, configured to receive the deformation signal, and to determine the vertical load applied to the wheel, based on the deformation of the rim detected by the sensor, and
wherein the processing unit is configured to:
store measurements made by the sensor and detects a first LMIN value of absolute minimum, a second LMAX value of absolute maximum and a Lt_med value of relative minimum of the deformation signal generated by said sensor during a rotation of the rim, and
calculate the value of the vertical load acting on the wheel, based on the detected a first LMIN value of absolute minimum, the second LMAX value of absolute maximum and the Lt_med value of relative minimum of the deformation signal generated by said sensor.

12. The wheel according to claim 11, wherein the sensor is housed in a seat on a surface of the rim and wherein the sensor is adapted to detect a deformation of said seat.

13. A vehicle comprising a wheel, said wheel comprising a rim including a measuring system to detect a vertical load applied to the wheel in operating conditions with wheel mounted with horizontal rotation axis, and a tyre mounted on that rim,
the measuring system comprising:
a sensor to detect a deformation of the rim and to transmit a deformation signal related to the detected deformation, and
a processing unit, operatively connected to the sensor, configured to receive the deformation signal, and to determine the vertical load applied to the wheel, based on the deformation of the rim detected by the sensor, and
wherein the processing unit is configured to:
store measurements made by the sensor and detects a first LMIN value of absolute minimum, a second LMAX value of absolute maximum and a Lt_med value of relative minimum of the deformation signal generated by said sensor, and calculate the value of the vertical load acting on the wheel, based on the detected a first LMIN value of absolute minimum, the second LMAX value of absolute maximum and the Lt_med value of relative minimum of the deformation signal generated by said sensor, and
wherein the measurement system comprises a wireless transmitter module to transmit measurements of the load acting on the wheel, and wherein the vehicle comprises a remote unit adapted to receive said measurements of the load acting on the wheel.

14. The vehicle according to claim 13, wherein the sensor is housed in a seat on a surface of the rim and wherein the sensor is adapted to detect a deformation of said seat.

15. The vehicle according to claim 13, further comprising a plurality of actuators, wherein the remote unit uses the measurements of the load acting on the wheel to control at least one actuator of said plurality of actuators.

* * * * *